United States Patent Office 2,905,586
Patented Sept. 22, 1959

2,905,586
NEMATOCIDE

Marion W. Harman, Nitro, W. Va., assignor to Monsanto Chemical Company, St. Louis, Mo., a corporation of Delaware No Drawing. Application December 27, 1955
Serial No. 555,315

9 Claims. (Cl. 167—22)

This invention relates to methods of rendering innocuous parasitic worms present in soil used for agricultural purposes by applying suitable means of destruction or control. More particularly the present invention relates to the destruction of those parasitic worms known as nematodes, in any of the egg, larvae and adult stages of their life cycles and particularly those harmful worms which inhibit or adversely affect the normal development of crop plants.

The problem of controlling harmful and unwanted parasites present in the soil, such as nematodes, is one of considerable complexity. In order to be an effective toxicant, a compound must be able to penetrate the normally impervious outer covering of the worm as well as the enclosing membranes of the larvae and eggs and to interfere with some vital function of the organism. While the exact mechanism of destroying the soil worm life is not fully understood, it is believed that the effective toxicants destroy or reduce to a low level the effectiveness of vital enzymes. A compound which is effective must be one that will remain in the soil in contact with the undesirable worm life for a sufficient period of time to effect the penetration of the worm and to destroy it by one means or another. To accomplish this result, it is necessary that the toxicant resist the destructive action of soil bacteria, be capable of wetting or penetrating the parasite, possess a substantial water dispersibility, be capable of ready mixture with the soil and to possess a sufficiently low vapor pressure so that it does not evaporate before its destructive action is accomplished. Since the exacting requirements of any practical agent cannot be recognized by methods other than by test, it is necessary to observe the effectiveness of chosen compounds against the life cycle of the parasite.

Proceeding by the test methods hereinafter described, it has been found that a class of chemical products known as esters of monosubstituted dithiocarbamic acids are effective nematocides. Such products may be represented by the general formula

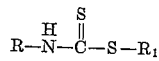

where R is an aliphatic organic radical containing not more than five carbon atoms and $R_1$ is a lower open chain unsaturated radical, preferably an allyl or chlor substituted allyl group. The aliphatic radical R may represent such groupings as alkyl, alkoxyalkyl, alkenyl and alkenyloxy. The method whereby the compounds of the class mentioned may be obtained is set forth and claimed in application Serial No. 546,275, filed November 10, 1955, by Harman et al.

Further details of the practice of this invention are set forth in the following examples.

Example 1

A preliminary screening experiment was conducted by preparing a suspension of the nematode *Panagrellus redivivus* in water and observing through a microscope the motility of the organisms in the presence of concentrations of 0.1% and 0.01% of allyl methyl dithiocarbamate. A control experiment containing no added toxicant was also employed. The nematode in aqueous suspension will flex its body at a regular rate and as the nematocide takes effect, the rate of flexing is decreased until death of the parasite occurs. In the present experiment, the control experiment showed undiminished activity after 24 hours while in the case of the toxicant under test complete destruction of the nematode was effected in 24 hours.

Example 2

In another test, heat sterilized soil was infested with nematodes (Meloidogyne sp.) and different portions treated with solutions containing concentrations of 0.1 and 0.01% by weight of allyl methyl dithiocarbamate. After standing for a week, two week old tomato plants were transplanted in the test soil and also in untreated, heat-sterilized soil. The plants were allowed to grow for two months, then were harvested, the roots washed and examined. The results showed no nematode infestation and only very slight phytotoxicity in both the untreated and treated soils.

Other compounds within the field described were tested as nematocides in the manner as described in the two examples shown and equally good results obtained, that is complete destruction of nematode life within a 24 hour period. The compounds are:

2-chloroallyl methyl dithiocarbamate
Cis- and trans-2,3-dichloroallyl methyl dithiocarbamate
Allyl ethyl dithiocarbamate
2-chloroallyl ethyl dithiocarbamate
Allyl 2-vinyloxyethyl dithiocarbamate
2-chloroallyl 2-vinyloxyethyl dithiocarbamate
Allyl (3-methoxypropyl)dithiocarbamate
2-chloroallyl (3-methoxypropyl)dithiocarbamate
2-chloroallyl (3-dimethylaminopropyl)dithiocarbamate
Allyl (2-methoxyethyl)dithiocarbamate
2-chloroallyl N-(2-methoxyethyl)-dithiocarbamate
Allyl allyl dithiocarbamate
2-chloroallyl allyl dithiocarbamate.

In actual usage any of the compounds within the preferred class described may be added to the soil in solution, as an emulsion or water dispersion but preferably is added in a solid formulation wherein the active nematocide is distributed over some dry and permanently free flowing powder such as the clays, including bentonite and attapulgite or such materials as talc, diatomaceous earth, fuller's earth, chalk, calcium carbonate and the like. These diluents possess the added advantage of lower cost treatment since normally they comprise more than 50% up to 98% of the complete formulation and thereby provide a means of more even distribution of the active material over a wider area and in the effective quantities required. These nematocidal compositions will of course attack the soil phase of the life cycle of nematode parasites which infest animals. Treating barnyards, chicken pens, stables and other infested areas destroys eggs and infective larvae of many parasites which infest animals. Moreover, the compositions are effective for the control of nematodes in their environment which includes bodies of animals. They are toxic to other worms such as flukes and tapeworms.

In the use of esters of lower open chain monosubstituted dithiocarbamic acids as nematocides or soil fumigants the active compounds, diluted or undiluted, may be applied to the soil at rates of 10 to 500 pounds per acre. The preferred application for treating soils of average nematode infestation will be from 25 to 100 pounds per acre. The formulation may contain dispersants which aid uniform distribution.

It is intended to cover all changes and modifications of the examples of the invention herein chosen for purposes of disclosure which do not constitute departures from the spirit and scope of the invention.

What is claimed is:

1. The method of agriculture which comprises applying to agricultural soil, at a concentration toxic to nematodes within the range 10–500 lbs./acre, an unsaturated ester of a monosubstituted dithiocarbamic acid having the chemical structure $$R-\underset{H}{N}-\underset{\|}{\overset{S}{C}}-S-R'$$

where R is an acyclic radical containing not more than five carbon atoms selected from the group consisting of lower mono-olefinic acyclic hydrocarbon radicals containing the double bond in the 2-position, lower alkyl radicals and lower alkyl radicals containing at least two but not more than three carbon atoms substituted by a radical selected from the group consisting of lower alkoxy, di(lower alkyl)amino and vinyloxy radicals and R' is selected from a group consisting of allyl and chlor substituted allyl.

2. The method of agriculture which comprises applying to agricultural soil, at a concentration toxic to nematodes within the range of 10–500 lbs./acre, an unsaturated ester of a monosubstituted dithiocarbamic acid having the chemical structure $$R\underset{H}{N}-\underset{\|}{\overset{S}{C}}-SCH_2CH=CH_2$$

where R represents a mono-olefinic acyclic hydrocarbon radical of less than six carbon atoms containing the double bond in the 2-position.

3. The method of agriculture which comprises applying to agricultural soil, at a concentration toxic to nematodes within the range of 10–500 lbs./acre, an unsaturated ester of a monosubstituted dithiocarbamic acid having the chemical structure $$CH_3(CH_2)_n\underset{H}{N}-\underset{\|}{\overset{S}{C}}-SCH_2CH=CH_2$$

where $n$ is an integer from zero to four inclusive.

4. The method of agriculture which comprises applying to agricultural soils, in a concentration toxic to nematodes within the range of 10–500 lbs./acre an allyl ester of a monosubstituted dithiocarbamic acid having the formula $$CH_3O(CH_2)_n\underset{H}{N}-\underset{\|}{\overset{S}{C}}-SCH_2CH=CH_2$$

where $n$ is an integer greater than one but less than four.

5. The method of agriculture which comprises applying to agricultural soils, in a concentration toxic to nematodes within the range of 20–500 lbs./acre allyl methyldithiocarbamate.

6. The method of agriculture which comprises applying to agricultural soils, in a concentration toxic to nematodes within the range of 10–500 lbs./acre, allyl ethyldithiocarbamate.

7. The method of agriculture which comprises applying to agricultural soils, in a concentration toxic to nematodes within the range of 10–500 lbs./acre, allyl allyldithiocarbamate.

8. The method of agriculture which comprises applying to agricultural soils, in a concentration toxic to nematodes within the range of 10–500 lbs./acre, 2-chloroallyl methyldithiocarbamate.

9. The method of agriculture which comprises applying to agricultural soils, in a concentration toxic to nematodes within the range of 10–500 lbs./acre, 2-chloroallyl ethyldithiocarbamate.

References Cited in the file of this patent

UNITED STATES PATENTS

| | | |
|---|---|---|
| 1,972,961 | Tisdale | Sept. 11, 1934 |
| 2,127,375 | Bousquet | Aug. 16, 1938 |
| 2,677,698 | Deutschman | May 4, 1954 |
| 2,744,898 | Harman | May 8, 1956 |

FOREIGN PATENTS

| | | |
|---|---|---|
| 742,185 | Germany | May 12, 1943 |

UNITED STATES PATENT OFFICE

CERTIFICATE OF CORRECTION

Patent No. 2,905,586 September 22, 1959

Marion W. Harman

It is hereby certified that error appears in the printed specification of the above numbered patent requiring correction and that the said Letters Patent should read as corrected below.

Column 4, line 12, claim 5, for "range of 20—500 lbs." read — range of 10—500 lbs. —.

Signed and sealed this 8th day of March 1960.

(SEAL)
Attest:

KARL H. AXLINE
Attesting Officer

ROBERT C. WATSON
Commissioner of Patents